Dec. 6, 1932.  E. ARMOUR ET AL  1,890,354
AIRPLANE
Filed Dec. 21, 1931  5 Sheets-Sheet 3

Earl Armour
AND John Kremer, INVENTORS
BY Victor J. Evans & Co.
ATTORNEY

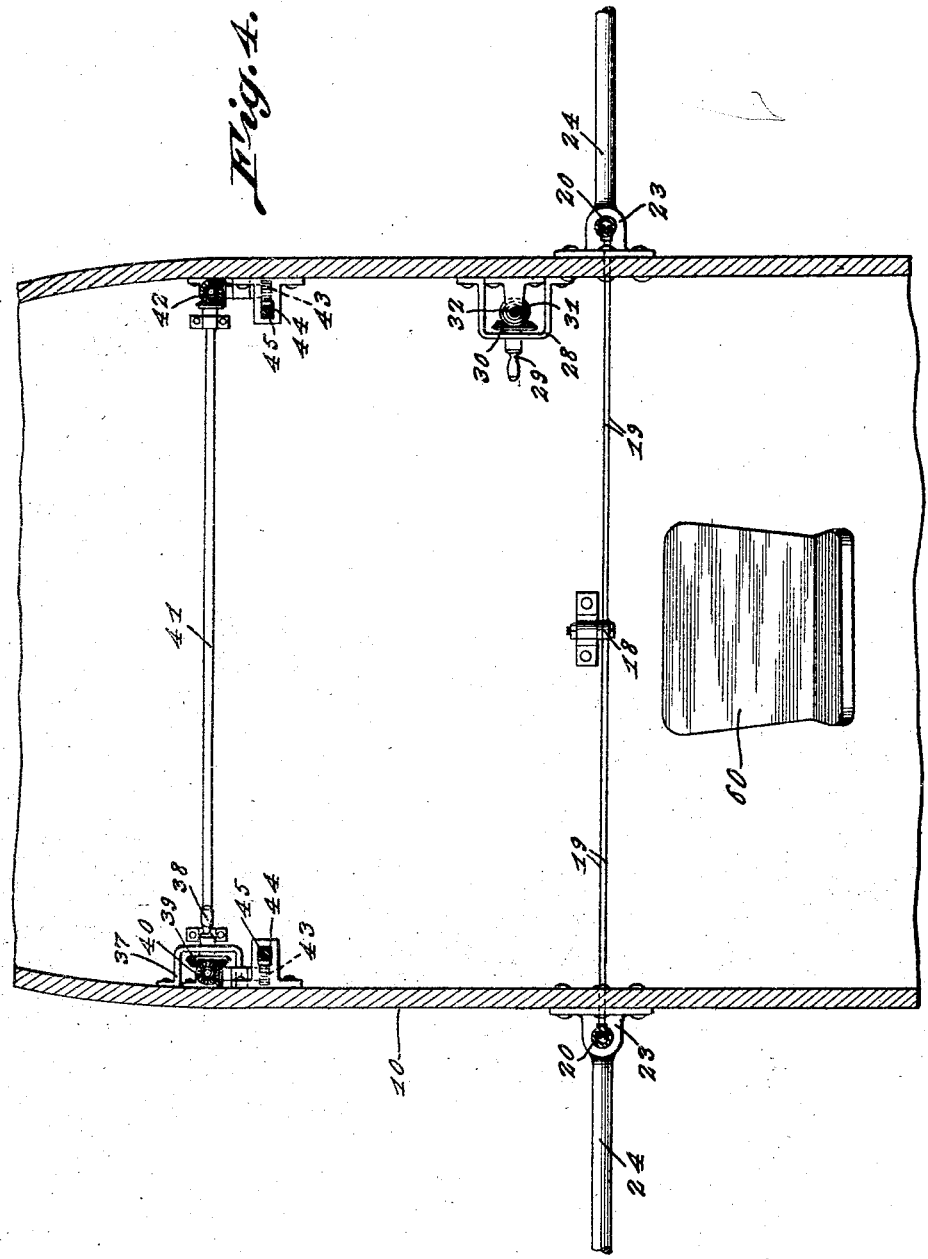

Dec. 6, 1932.　　　　　E. ARMOUR ET AL　　　　　1,890,354
AIRPLANE
Filed Dec. 21, 1931　　　　5 Sheets-Sheet 5
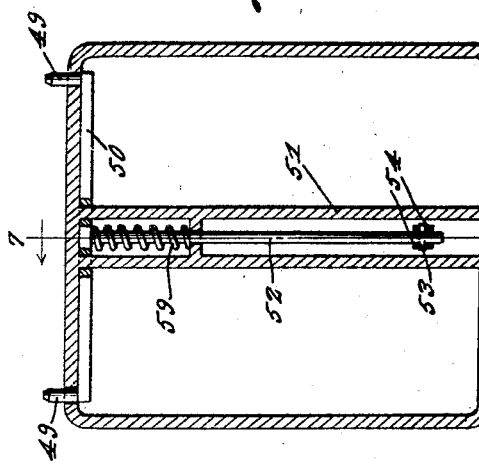
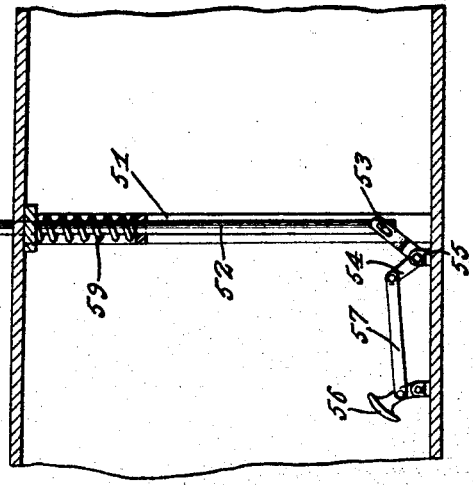
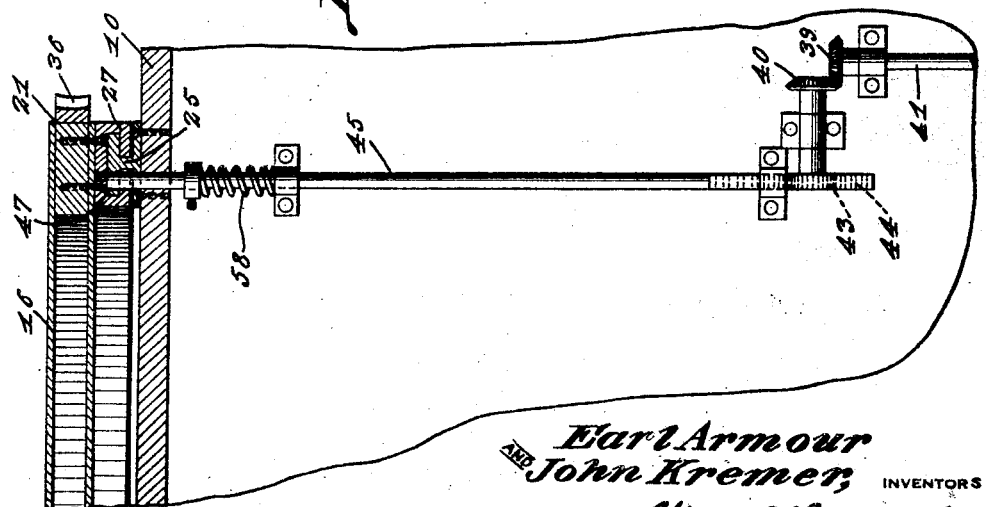
Earl Armour and John Kremer, INVENTORS
BY Victor J. Evans & Co. ATTORNEY Patented Dec. 6, 1932

1,890,354

UNITED STATES PATENT OFFICE

EARL ARMOUR, OF RICHMOND, AND JOHN KREMER, OF ST. LOUIS COUNTY, MISSOURI

AIRPLANE

Application filed December 21, 1931. Serial No. 582,412.

The invention relates to airplanes and more especially to aircraft of the cabin monoplane type with foldable wing sections.

The primary object of the invention is the provision of an aircraft of this character wherein the wing sections are supported upon the fuselage in a manner to permit the folding of the wing sections close to and over the fuselage so that the craft can be conveniently housed in minimum space, the wing sections being operable from within the fuselage and simultaneously actuated to bring the same to folded or unfolded position without the necessity of assistance as such mechanism is controllable by the pilot or operator of the machine.

Another object of the invention is the provision of an aircraft of this character wherein the swinging wing sections are locked either folded or unfolded, the locking mechanism being of novel form and is controllable by the pilot or operator of the craft, both the mechanism for the swinging of the wing sections and the locking mechanism being readily accessible to such pilot and are regulated within the cab of the fuselage.

A further object of the invention is the provision of an aircraft of this character wherein the swinging wing sections are movable upon a track and such sections are slidably connected therewith so as to render the sections rigid when in folded or unfolded position and also to assure the convenient and easy swinging of such sections to said positions.

A still further object of the invention is the provision of an aircraft of this character wherein the wing sections are so mounted as to be strong and rigidly supported during movement and also when assuming folded or unfolded position.

A still further object of the invention is the provision of an aircraft of this character which is comparatively simple in construction, thoroughly reliable and efficient in its purpose and operation, strong, durable, the wing sections being readily and easily operated with dispatch and controllable by the pilot of the craft, and also inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 4 is a sectional view on the line 4—4 of Figure 3 looking in the direction of the arrows.

Figure 5 is a fragmentary detail vertical sectional view of a portion of the locking mechanism.

Figure 6 is a vertical sectional view showing a modified form of locking mechanism for each wing section.

Figure 7 is a sectional view on the line 7—7 of Figure 6 looking in the direction of the arrows.

Similar reference characters indicate corresponding parts throughout the several views in the drawings.

Figure 1:
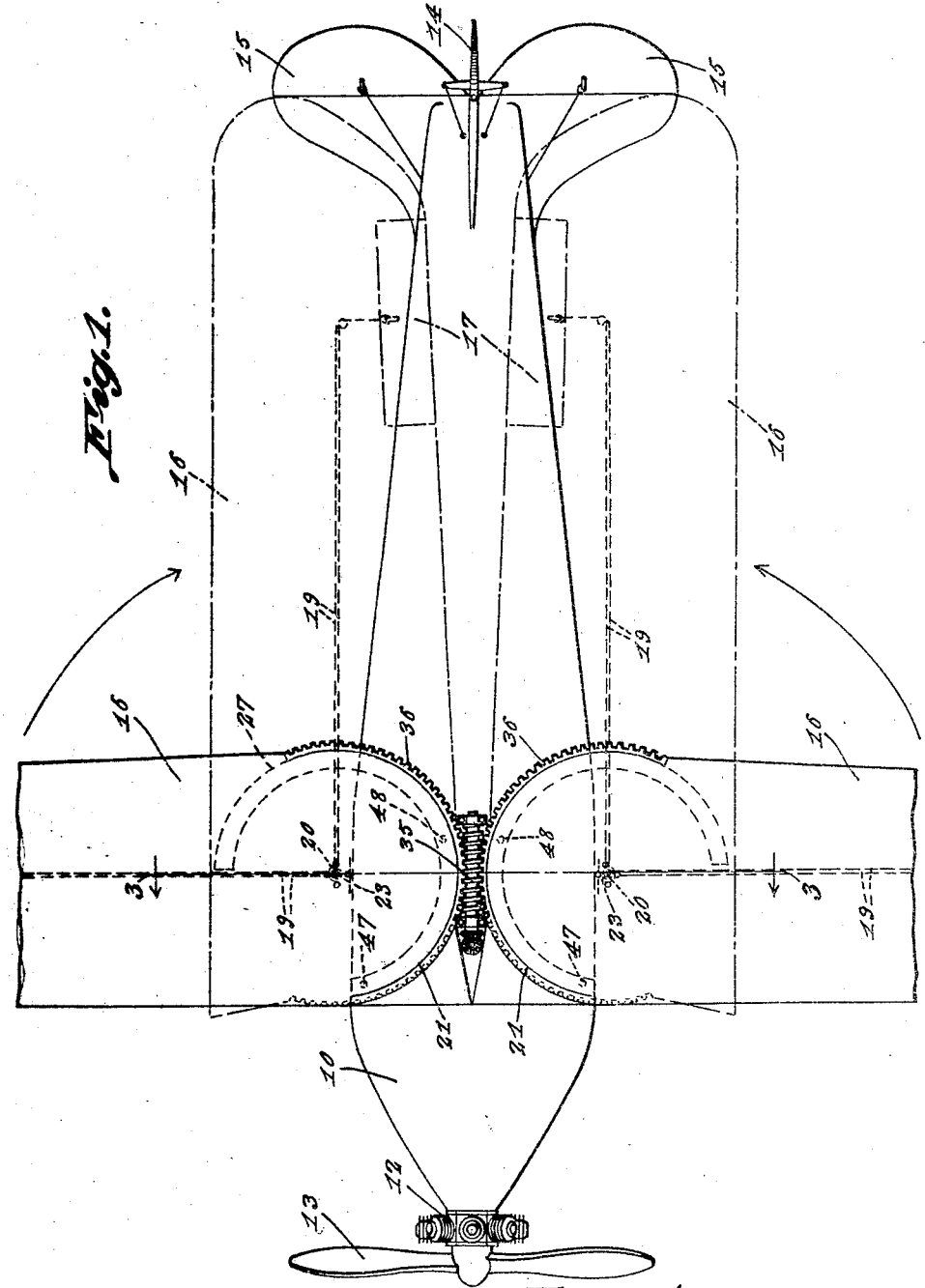
Figure 1 is a fragmentary top plan view of an aircraft showing the foldable wing sections by full lines in extended or unfolded position and by dotted lines in folded or retracted position.
Figure 2:
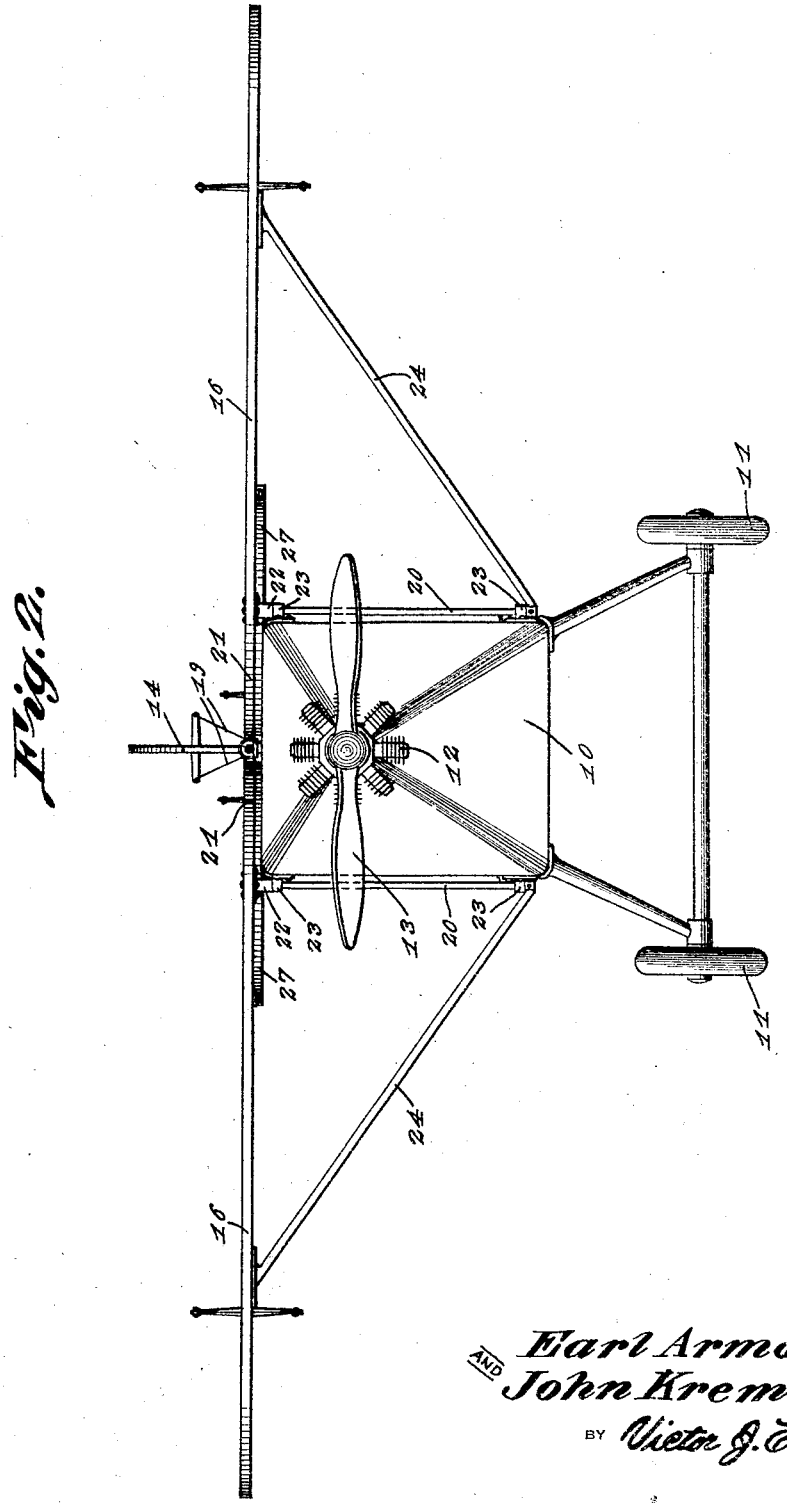
Figure 2 is a front elevation of the craft.
Figure 3:
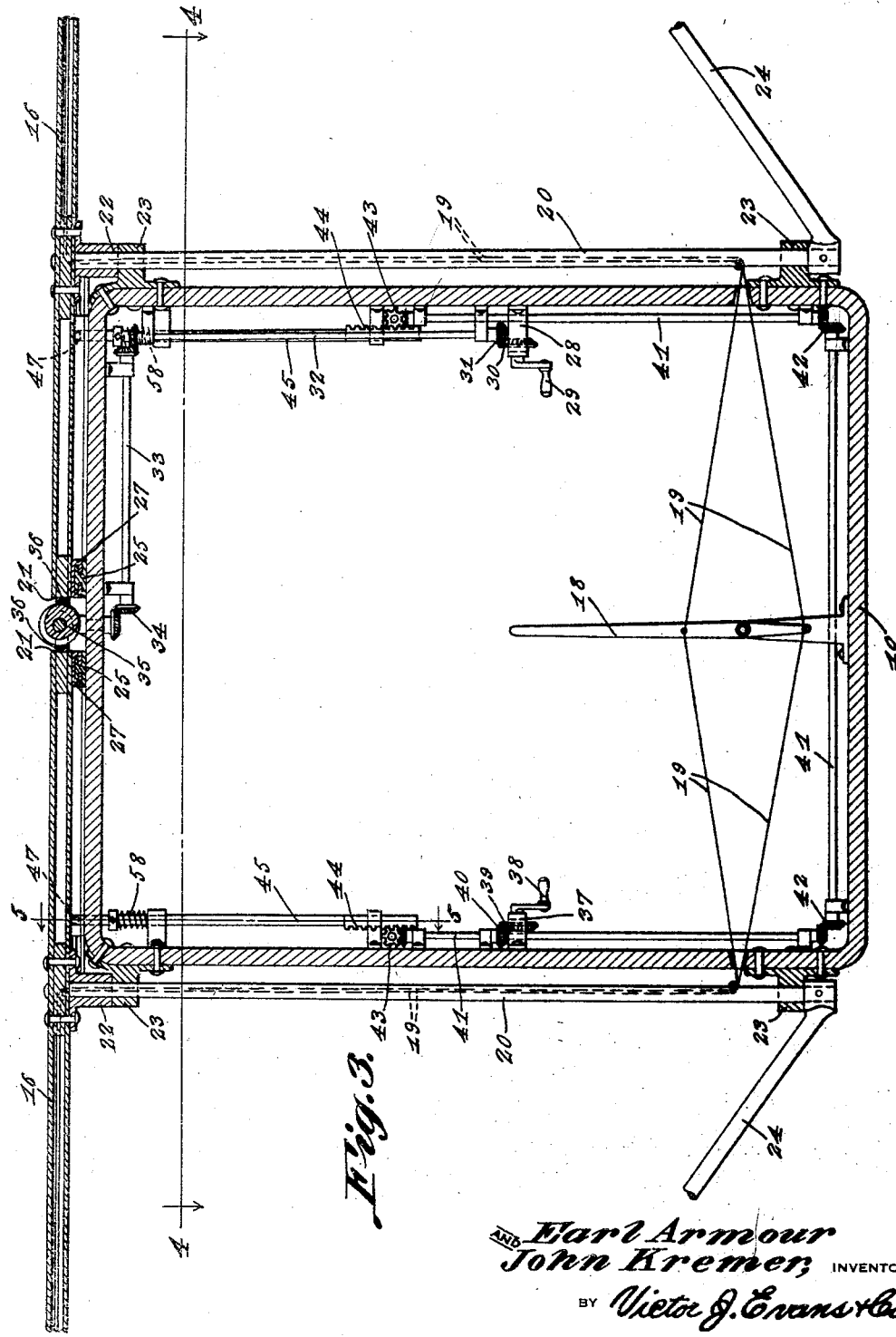
Figure 3 is an enlarged fragmentary vertical transverse sectional view through the craft.

Referring to the drawings in detail the aircraft, which in this instance is of the cabin monoplane type, comprises a fuselage 10 fitted with landing gear 11 which may be of standard construction, motor 12, tractor screw or propeller 13, rudder 14, elevators 15 and foldable wing sections 16 respectively, these being fitted with ailerons 17.

The fuselage 10 is of the cabin type and has mounted therein in convenient reach of the pilot or operator of the craft the usual joy stick or control lever 18 actuating the cables 19 directed to the rudder 14, elevators 15 and ailerons 17, this equipment being no part of the present invention and for convenience when mounting the cables 19 are trained through pivot rods 20 for the wing sections 16, as well as through the fuselage to their respective parts.

The wing sections 16 are formed with circular inner ends 21 and at the center of these circular ends are fixed hubs 22, these being made fast to the upper ends of the pivot rods 20 which are vertically journaled in bearings 23 externally on and projected laterally from opposite sides of the fuselage 10. The lower ends of the pivot rods 20 have coupled therewith wing bracing struts 24, these being made fast to the under faces of the wing sections 16 consistently with the spread thereof.

Mounted upon the top of the fuselage 10 beneath and following the circular ends 21 of the wing sections are substantially I-shaped tracks 25, these being made fast to the fuselage in any suitable manner and extended beyond the sides of the fuselage. The wing sections have fixed thereto at their rounded inner ends 21 rail embracing clips 27 which are adapted to slide upon the rails 25 during the turning of the wing sections 16, the clips 27 snugly embracing the rails and are free for sliding movement thereof.

Within the cab of the fuselage 10 on one side thereof is a bracket 28 having journaled therein a hand crank 29 in convenient reach of the pilot or operator of the craft and this crank operates a gear 30 meshing with a pinion 31 on a turning shaft 32, the latter suitably journaled vertically within the cab and through the countershaft 33 and driven connections 34 with a worm screw 35 meshing with toothed segments 36 on the circular ends 21 of the wing sections 16 operate the latter for the swinging of said sections at right-angles to the fuselage or parallel therewith for the extending or folding of these sections as will be apparent in Figure 1 of the drawings by full and dotted lines therein. Thus it will be seen that the wing sections 16 can be manually manipulated by the turning of the crank 29 to fold or unfold said sections.

On the other side of the cabin of the fuselage 10 opposite the bracket 28 is another bracket 37 having journaled therein a hand crank 38 operating a gear 39 meshing with a pinion 40 upon a driving shaft 41, the latter through the shafts 41 and gear connections 42 with rack gears 43 meshing with racks 44 upon locking bolts 45 operate the same. These bolts are vertically supported within the cabin at opposite sides thereof and are projected through the top of the fuselage to engage in keeper sockets 47 and 48 respectively in the wing sections 16 to lock the same folded or unfolded so that said wing sections will be made fast in extended or retracted position.

Thus it will be seen that a single crank 38 operates simultaneously the two bolts 45 at opposite sides of the fuselage within its cabin and likewise a single crank 29 operates both wing sections 16, this being simultaneously movable and likewise the bolts 45. The crank 39 similar to the crank 29 is in convenient reach of the pilot or operator of the craft.

In Figures 6 and 7 there is shown a slight modification of the locking mechanism wherein the locking bolts 49 are arranged upon a crosshead 50 slidably fitted in a vertical guide 51 located centrally of the cabin of the fuselage 10 and this crosshead 50 has a stem 52 pivoted at 53 to a bell crank 54 supported in a bearing 55 on the floor or base of the cabin and this bell crank is operable from a foot pedal 56 connected therewith through a link 57 so that the locking bolt 49 will be foot controlled in contradistinction to the hand control through the use of the hand crank 38.

The locking bolts 45 are tensioned by coiled tensioning springs 58 and likewise the stem 42 is tensioned by a tensioning spring 59 as is clearly shown in Figures 5 to 7 of the drawings.

Within the cabin of the fuselage 10 contiguous to the joy stick or control lever 18 is a pilot's seat 60 of any conventional form.

It is of course to be understood that there may be employed suitable anti-friction bearings located at the clips 27 so as to assure free and easy movement of the said clips when sliding about the rail.

It is of course to be understood that the clips 27 upon each wing section are of an extent to permit of the full swing of the wing section from folded to unfolded position or vice versa.

What is claimed is:—

1. In an aircraft, a fuselage, bearings mounted externally at opposite sides of the fuselage, turning shafts journaled in said bearings, wing sections carried by said turning shafts and adapted to swing in a horizontal plane, inner rounded ends formed on said wing sections, segmental gears carried at the rounded ends, a worm screw mounted between the rounded ends and meshing with the segmental gears, a hand crank arranged within the fuselage convenient to a pilot, driven connections between the crank and said worm screw for operating the latter, wing bracing struts connected with said turning shafts and the wing sections, stationary substantially I-shaped tracks at the top of the fuselage, and slide clips carried by the rounded ends of the wing sections and embracing said tracks.

2. In an aircraft, a fuselage, bearings mounted externally at opposite sides of the fuselage, turning shafts journaled in said bearings, wing sections carried by said turning shafts and adapted to swing in a horizontal plane, inner rounded ends formed on said wing sections, segmental gears carried at the rounded ends, a worm screw mounted between the rounded ends and meshing with the segmental gears, a hand crank arranged within the fuselage convenient to a pilot, driven connections between the crank and said worm screw for operating the latter, wing bracing struts connected with said turning shafts and the wing sections, stationary substantially I-shaped tracks at the top of the fuselage, slide clips carried by the rounded ends of the wing sections and embracing said tracks, and locking means for the wing sections and operable within the fuselage.

3. In an aircraft, a fuselage, bearings mounted externally at opposite sides of the fuselage, turning shafts journaled in said bearings, wing sections carried by said turning shafts and adapted to swing in a horizontal plane, inner rounded ends formed on said wing sections, segmental gears carried at the rounded ends, a worm screw mounted between the rounded ends and meshing with the segmental gears, a hand crank arranged within the fuselage convenient to a pilot, driven connections between the crank and said worm screw for operating the latter, wing bracing struts connected with said turning shafts and the wing sections, stationary substantially I-shaped tracks at the top of the fuselage, slide clips carried by the rounded ends of the wing sections and embracing said tracks, locking means for the wing sections and operable within the fuselage, and hubs on the wing sections centrally of the rounded inner ends and made fast to the turning shafts at their upper extremities.

4. In an aircraft, a fuselage, bearings mounted externally at opposite sides of the fuselage, turning shafts journaled in said bearings, wing sections carried by said turning shafts and adapted to swing in a horizontal plane, inner rounded ends formed on said wing sections, segmental gears carried at the rounded ends, a worm screw mounted between the rounded ends and meshing with the segmental gears, a hand crank arranged within the fuselage convenient to a pilot, driven connections between the crank and said worm screw for operating the latter, wing bracing struts connected with said turning shafts and the wing sections, stationary substantially I-shaped tracks at the top of the fuselage, slide clips carried by the rounded ends of the wing sections and embracing said tracks, locking means for the wing sections and operable within the fuselage, hubs on the wing sections centrally of the rounded inner ends and made fast to the turning shafts at their upper extremities, and braces externally of the fuselage and connected with the said tracks.

In testimony whereof we affix our signature.

EARL ARMOUR.
JOHN KREMER.